United States Patent
Cooper et al.

(10) Patent No.: US 9,378,093 B2
(45) Date of Patent: Jun. 28, 2016

(54) CONTROLLING DATA STORAGE IN AN ARRAY OF STORAGE DEVICES

(71) Applicant: International Business Machines Corporation, Armonk, NY (US)

(72) Inventors: Alastair Cooper, Winchester (GB); Gordon D. Hutchison, Eastleigh (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 135 days.

(21) Appl. No.: 14/224,431

(22) Filed: Mar. 25, 2014

(65) Prior Publication Data

US 2014/0325262 A1 Oct. 30, 2014

(30) Foreign Application Priority Data

Apr. 25, 2013 (GB) .................................. 1307463.8

(51) Int. Cl.
G06F 11/00 (2006.01)
G06F 11/10 (2006.01)

(52) U.S. Cl.
CPC .......... G06F 11/1092 (2013.01); G06F 11/108 (2013.01)

(58) Field of Classification Search
USPC ........................................................... 714/6
See application file for complete search history.

(56) References Cited

U.S. PATENT DOCUMENTS

| 8,099,623 B1 | 1/2012 | Li et al. | |
| 8,200,887 B2 | 6/2012 | Bennett | |
| 2003/0088805 A1* | 5/2003 | Majni | G06F 11/108 714/5.1 |
| 2005/0193273 A1 | 9/2005 | Burkey | |
| 2007/0067666 A1 | 3/2007 | Ishikawa et al. | |
| 2009/0300079 A1* | 12/2009 | Shitomi | G06F 3/0605 |
| 2010/0077252 A1* | 3/2010 | Siewert | G06F 11/2094 714/6.12 |
| 2010/0169575 A1 | 7/2010 | Masaki et al. | |
| 2010/0205372 A1 | 8/2010 | Daikokuya et al. | |
| 2010/0251012 A1 | 9/2010 | Zwisler et al. | |

(Continued)

FOREIGN PATENT DOCUMENTS

| CN | 101576833 B | 5/2012 |
| CN | 102495680 A | 6/2012 |

(Continued)

OTHER PUBLICATIONS

Combined Search and Examination Report, Application No. GB1307463.8, Intellectual Property Office, United Kingdom, Oct. 17, 2013.
Courtright II et al., "RAIDframe: A Rapid Prototyping Tool for RAID Systems", Parallel Data Laboratory, School of Computer Science, Carnegie Mellon University, Pittsburgh, PA, Version 1.0, Aug. 29, 1996.
Patterson et al., A Case for Redundant Arrays of Inexpensive Disks (RAID), Computer Science Division, Department of Electrical Engineering and Computer Sciences, University of California, 1988, pp. 109-116.

(Continued)

*Primary Examiner* — Sarai Butler
(74) *Attorney, Agent, or Firm* — Michael Lestrange; Andrew M. Calderon; Roberts Mlotkowski Safran & Cole, P.C.

(57) ABSTRACT

Methods, apparatus and computer programs have been provided for mitigating a problem of non-optimal recovery from storage device failures. A method involves determining a required write performance for rebuilding data of a failed device, based at least partly on the potential read performance of storage devices in a data rebuild; and allocating a virtual storage area within available storage, which allocation of virtual storage is based at least partly on the required write performance. Data is rebuilt by writing to the allocated virtual storage area, and data recovery is completed by migrating this rebuilt data to at least one data storage device such as a spare physical storage device within the array.

18 Claims, 6 Drawing Sheets

(56) References Cited

U.S. PATENT DOCUMENTS

| | | | |
|---|---|---|---|
| 2012/0072767 A1 | 3/2012 | Nagpal et al. | |
| 2012/0089867 A1* | 4/2012 | Bartlett | G06F 11/2092 714/6.22 |
| 2013/0055013 A1* | 2/2013 | Seki | G06F 11/1092 714/6.24 |
| 2014/0215147 A1* | 7/2014 | Pan | G06F 11/1092 711/114 |

FOREIGN PATENT DOCUMENTS

| | | |
|---|---|---|
| JP | 4817783 B2 | 11/2011 |
| WO | 2012051931 A1 | 4/2012 |

OTHER PUBLICATIONS

Li et al., "PDRS: A New Recovery Scheme Application for Vertical RAID-6 Code", 2011 Sixth IEEE International Conference on Networking, Architecture, and Storage, pp. 112-121.

Im et al., "Flash-Aware RAID Techniques for Dependable and High-Performance Flash Memory SSD", IEEE Transactions on Computers, vol. 60, No. 1, Jan. 2011.

Guo, "Method for Rebuilding a Disk Array by Mapping Multiple Independent Arrays to Physical Disks", IP.com No. IPCOM000211534D, IP.com Electronic Publication: Oct. 10, 2011, pp. 1-4.

\* cited by examiner

| Disk 1 | Disk 2 | Disk 3 | Disk 4 | Disk 5 |
|--------|--------|--------|--------|--------|
| Parity | Block 1 | Block 2 | Block 3 | Block 4 |
| Block 5 | Parity | Block 6 | Block 7 | Block 8 |
| Block 9 | Block 10 | Parity | Block 11 | Block 12 |
| Block 13 | Block 14 | Block 15 | Parity | Block 16 |
| EMPTY | EMPTY | EMPTY | EMPTY | EMPTY |

CONTROLLING DATA STORAGE IN AN ARRAY OF STORAGE DEVICES

CROSS-REFERENCE TO RELATED APPLICATIONS

This application claims the benefit of priority from United Kingdom patent application number GB1307463.8, filed Apr. 25, 2013, which is hereby incorporated by reference in its entirety.

FIELD OF THE INVENTION

The present invention relates to controlling data storage in an array of storage devices which provides redundancy, so as to enable rebuilding of data lost due to failure of a device of the array. In particular, at least one aspect of the invention relates to rebuilding data within an array of devices for which read and write speeds differ, either because of inherently different read and write speeds or because data read from many devices is written to a single spare device.

BACKGROUND

In this specification, the words data "restoration", data "reconstruction", data "rebuilding" or data "recovery" are used interchangeably to designate the activity of rebuilding data lost due to failure of a data storage device such as a solid state storage device. References to "disk" or "drive" or "device" failures are used interchangeably, although it is well understood that not all storage drives use rotating disks. RAID arrays can be implemented using solid state drive (SSD) devices, for example. The present invention enables data recovery regardless of the cause of failure of one of the devices within an array of storage devices.

A RAID storage architecture is an architecture that combines a plurality of physical disks connected to an array controller, which is connected via one or more high bandwidth buses to one or more host computers.

RAID stands for "Redundant Array of Independent Disks" or "Redundant Array of Inexpensive Disks". The links between the controller and each storage device in the array may include Small Computer System Interface (SCSI) links. The array controller is typically responsible for controlling an individual disk or solid state drive, maintaining redundant information, executing requested transfers, and recovering from disk failures. The array combines the plurality of storage devices in a logical unit so that the array appears to the or each host computer as a linear sequence of data units, numbered for example 1 to N.B, where N is the number of devices in the array and B is the number of units of user data on each device.

Fundamental to all RAID arrays is the concept of striping consecutive units of data across the devices of the array. As introduced in "RAIDFrame a Rapid Prototyping Tool for RAID systems", by William V. Courtright II, August 1996, striping is defined as breaking up linear address space exported by the array controller into blocks of some size and assigning consecutive blocks to consecutive devices rather than filling each device with consecutive data before switching to the next. The striping unit or stripe unit, which is set by the controller, is the maximum amount of consecutive data assigned to a single device. The striping unit can be, for example, a single bit or byte or some other data size smaller than the entire storage capacity of a physical device. Striping has two main benefits: automatic load balancing in concurrent workloads and high bandwidth for large sequential transfers by a single process. An N-disk coarse-grain striped array can service a number N of I/O (Input/Output) requests in parallel.

RAID arrays as defined in "A case for Redundant Arrays of Inexpensive Disks (RAID)" were introduced by David Patterson, Garth A. Gibson, and Randy Katz in 1987. The authors had originally conceived five standard schemes which are referred to as RAID levels 1 through 5. Many more variations, for example nested levels, have evolved in the standards or as proprietary solutions. RAID levels and their associated data formats are standardized by the Storage Networking Industry Association (SNIA) in the Common RAID Disk Drive Format (DDF) standard. Each scheme provides a different balance between three key goals: resilience, performance, and capacity.

For example, in RAID level 4, data is distributed across multiple devices and parity data for protecting against data loss is confined to a single dedicated parity disk or equivalent device. Each device in the array operates independently, allowing I/O requests to be performed in parallel. However, the use of a dedicated parity disk can create a performance bottleneck. As the parity data must be written to a single, dedicated parity disk for each block of non-parity data, the overall write performance may largely depend on the performance of this parity disk.

In RAID level 5, there are a variety of ways to lay out data and parity such that the parity is evenly distributed over the disks. FIG. 1 illustrates graphically an exemplary RAID Level 5 array 10 having 5 independent disks labeled Disk 1 to 5 in the figure. The left-symmetric organization shown in FIG. 1 is an example of a typical RAID level 5 layout. Each disk has 5 blocks. The RAID level 5 array 10 is formed by placing the parity units along the diagonal and then placing the consecutive user data units on consecutive disks at the lowest available offset on each disk. In RAID level 5, the parity blocks are distributed throughout the array rather than being concentrated on a single disk. This avoids throughput loss encountered due to having only one parity disk. The data integrity of the array is not destroyed by a single drive failure. Upon drive failure, any data lost in the failed drive can be calculated using the distributed parity such that the drive failure is not visible to the end user.

In FIG. 1, "block i" (where i is an integer between 1 and 20 inclusive) represents a block of user data of unspecified size and "Parity i-j" represents a parity block computed over data blocks i through j. The parity blocks representing redundant information for recovering data blocks hold cumulative XOR over the corresponding data units. For example, Parity 1-4=Block1 XOR Block2 XOR Block3 XOR Block4. Following a single drive failure, the failed drive is replaced and the associated data rebuilt. As illustrated in FIG. 2, if Disk 2 fails, block 2 will be lost. Block 2 is then reconstructed from the redundant data available on the remaining working disks. For example block 2 is recovered as block 2=Parity 1-4 XOR Block 1 XOR Block 3 XOR Block 4. The recovered data may be rebuilt on a dedicated existing spare drive 23 or distributed across the remaining drives of the array. Some storage systems implement a swap action to replace a failed drive with another drive and the data on the failed drive can be rebuilt after the failed drive is replaced, but many applications require a very fast rebuild that cannot wait for drive replacement.

One implementation of RAID level 5 is RAID level-5 Enhanced (or RAID 5E), which has a built-in spare disk. This RAID implementation stripes data and parity across all of the disks in the array. However, in a traditional RAID 5 configuration with a hot spare or dedicated spare disk 23, the spare disk 23 sits next to the array waiting for a drive to fail, at which point the spare disk 23 is made available and the array rebuilds the data set with the new hardware. In RAID level 5E, the spare disk is actually part of the RAID level-5E array.

FIG. 3 shows an example of a RAID level-5E logical drive. A RAID 5E array comprises five physical disks (Disks 1 to 5). A logical disk is created over the 5 physical disks. The data is striped across the disks, creating blocks (Blocks 1 to 16) in the logical disk. It should be noted that the "EMPTY" space in this figure is shown at the end of the array (i.e. the end block of each disk). The "EMPTY" space is the free space corresponding to the distributed spare disk. The storage of the data parity (denoted by "Parity") is striped, and it shifts from disk to disk as it does in RAID level-5.

Referring to FIG. 4, when a disk 42 in a RAID 5E array fails, the data that was on the failed disk is reconstructed into remaining disks through use of the empty space at the end of the array. The array undergoes compression, and the distributed spare disk becomes part of the array. The logical disk remains RAID level-5E with parity blocks distributed across the disks. When the failed disk is replaced, the array is once again expanded to return the array to the original striping scheme (not shown on FIG. 4).

RAID level 6 is referred to as block-level striping with double distributed parity and provides fault tolerance of two drive failures as the array continues to operate with up to two failed drives.

Turning to the actual types of storage disks that can be provided in a RAID, Solid State Drive (SSD) devices are data storage devices that use nonvolatile flash memory to store data persistently. In contrast to traditional magnetic disks such as Hard Disk Drives (HDDs) or floppy disks, which are electromechanical devices containing spinning disks and movable read/write heads, SSDs do not employ any moving mechanical components and have lower latency than a spinning hard disk. If a hard disk has to read data from multiple locations, the drive heads are required to move between tracks and then typically have to wait some milliseconds for the correct blocks to rotate underneath them to be read.

A modern Solid State Drive performs much more quickly as it is a hard drive consisting of a collection of NAND (NOT AND) flash memories. Solid State Drives do not have moving heads and rotating platters. Every block of flash memory is accessible at the same speed as every other block of flash memory, whether the blocks are stored right next to each other or in different physical NAND chips. As a result, SSDs offer much lower latency and faster data access time compared to electromechanical disks. For example, when a HDD retrieves a large file, the above-described searches for the file may result in an access time of 10-15 ms whereas an SSD may retrieve the same file as quickly as 0.1 ms. SSD is typically about 10 times faster than the spinning disks in an HDD. In terms of Input/Output operations per second, SSDs can be used to replace multiple spinning disks. In addition to lower access time, SSDs can effectively read and write data faster offering quicker responses and faster transfer speeds resulting in higher throughput. SSD technology is therefore suitable for applications having high performance requirements. This makes SSD servers ideal for applications where throughput is important, such as video distribution or financial applications.

Several Solid State Drive devices can be installed in a server to form a RAID. SSDs and supported RAID controllers can be installed on several servers (e.g. System x and IBM iDataPlex® servers and BladeCenter® and IBM Flex System™ servers, which are all available from IBM Corporation). RAID arrays consisting of SSDs combine both the benefits of a RAID storage array and that of SSD devices, mainly fault tolerance and very fast data storage. Fault tolerance is provided in SSD RAID arrays by typical data reconstruction mechanisms onto spare disks as illustrated in the above examples of RAID levels 5 and 5E.

Generally, the inherent speed of SSDs allows for fast data reconstruction of a SSD RAID array when a SSD disk fails. However, SSDs exhibit some limitations: SSD disks can typically be read many times faster than they can be written to. As an example, SSD drives that are currently available from IBM® Corporation have a ratio of write speed to read speed which is either 1/4 or 3/20.

SSDs may be based on SLC (Single-Level Cell) or MLC (Multi-Level cell) NAND flash memory technology. SLC flash memory stores data in arrays of floating-gate transistors, or cells, 1 bit of data to each cell. MLC flash memory, in contrast to SLC flash memory, stores two bits of data per cell. MLC flash memory can be further delineated into two categories: Consumer-grade MLC (cMLC) used in consumer (single user) devices; and Enterprise-grade MLC (eMLC) designed specifically for use in enterprise environments (multiple user). Each of SLC, cMLC and eMLC have different characteristic read and write speeds and a different ratio between read and write speeds. For example, for a SLC device reading and writing 4 kB blocks of data, the read speed is 4,000 per second and the write speed 1,600 ps (i.e. read is 2.5 times faster than the write speed). This compares with HDD, for which a typical read speed is 320 ps and a typical write speed 180 ps (a ratio of 1.77). This asymmetry in read speed and write speed is even higher for cMLC and eMLC technologies, which typically achieve read speeds of 20,000 ps for 4 kB blocks of data and write speeds of 3,000 ps for the same size blocks—a ratio of 6.6. Thus, write operations are much slower than the read operations when using current SSDs.

In some RAID implementations, the difference between read speeds and write speeds during array reconstruction is partly due to the fact that data to be read is striped across several disks and the data is rebuilt on one dedicated spare disk. It is faster to read data in parallel from multiple disks, than to write the rebuilt data onto one dedicated spare disk. For example in RAID 5, during RAID array reconstruction, data is read from several remaining disks while the recovered data is being written to only one spare disk.

As will be understood by the person skilled in the art, distributed sparing does not suffer from the same level of asymmetry of read/write speeds. This is because a distributed sparing mechanism, such as the one in a RAID 5E storage system, involves a spare storage space distributed amongst the disks of the array (see FIGS. 3 and 4). Hence Input/Output operations that are required for the rebuild are spread across the remaining working disks, reducing the asymmetry in speeds of read and write operations. The asymmetry in read/write speeds does not, however, disappear in RAID arrays using a distributed sparing mechanism, because in the state of the art the number of disks being read from is generally equal to the number of disks being written to as the distributed spare space is on the same set of disks that are being read. It should be noted that distributed sparing schemes such as RAID 5E have not become ubiquitous as they have their own complexities and disadvantages. For example, reading from and writing to the same storage drive can be problematic. Dedicated sparing where a single disk is used as a spare is still the most widely used option for organizing the spare storage space.

In this context, the speed of writing data to a spare disk is a bottleneck during the rebuild of a RAID array. The time for rebuilding a RAID array is critical because, when a disk fails, there is a period of vulnerability which is characterized by intensive disk processing. During this time, the array reconstruction is vulnerable to a second failure. The longer it takes to rebuild the array, the longer this vulnerability period lasts. The speed of the array reconstruction is therefore critical when a disk fails.

The speed of reconstruction is also critical for a SSD RAID array because, generally, applications for which SSD technology is used are critical applications which do not tolerate high latencies (e.g. video distribution and financial analysis). The current bandwidth of SSDs is a bottleneck which limits the speed of write operations and therefore impedes the speed of SSD RAID array reconstruction. Therefore, there is a need to minimize the reconstruction time for storage arrays including high speed SSD arrays, in the event of a disk failure. Also, SSD devices have a limited lifespan in terms of numbers of accesses, so there is an expectation of the need for data rebuilds when SSDs are used for long-term persistent data storage.

SUMMARY OF THE INVENTION

A first aspect of the present invention provides a method of data recovery, for responding to failure of a storage device in an array of storage devices, the method comprising: determining a required write performance for rebuilding data of a failed device, based at least partly on the potential read performance of storage devices in a data rebuild; allocating a virtual storage area within available storage, which allocation of virtual storage is based at least partly on the required write performance; rebuilding data of a failed device by writing to the allocated virtual storage area; and migrating the rebuilt data to at least one data storage device to complete the data recovery.

In one embodiment of the invention, the potential read performance is determined by reference to a potential number of read input/output operations per second (IOPS) of data storage devices to be read during a data rebuild and/or the potential amount of data read in each read operation.

In one embodiment, determining a required write performance comprises calculating the required size of virtual storage area and/or a required write speed for rebuilding data of a failed device.

In one embodiment, the determination of a required write performance involves determining a required size of data storage area and determining a write speed required to match the expected number of read operations per second and the size of data blocks being read, for rebuilding data of the failing device. This can vary according to the number of devices remaining within the array and the inherent speed of those devices, and the time required to recalculate the data. A virtual storage area ("vdisk") is then allocated to achieve the determined matching write speed, or to approximate that speed as far as possible within the constraints of the system.

In an alternative embodiment, the determining of write performance determines a required data capacity based on which device has failed, then a request is made for an allocation of storage of the appropriate size. Then a storage controller allocates storage within the array to approximate an optimal write speed, within the constraints of the available devices within the array, taking account of the expected speed of read operations for the data rebuild.

In one embodiment, the allocation of a virtual storage area comprises allocating a vdisk to achieve a best possible match between the write performance of the vdisk (capacity and write speed) and the expected read performance (number of read operations per second and their data size) of the remaining devices of the array, to rebuild data lost due to failure of a device. The achievement of this optimal allocation may involve selection of a plurality of devices for the vdisk data to be distributed across (to allow parallel writing of data stripes), and selection of particular devices within an array of mixed-capability devices so that fast-speed devices are used optimally (i.e. either all remaining devices or a subset of fast-speed devices can be used in recovery when required; but not all devices will be required in all circumstances and it is not optimal to allocate too much storage for recovery). The allocated vdisk storage can be released once the data has been migrated to a spare storage device.

The allocated virtual storage area will typically be distributed across a number of the available storage devices of the array, instead of relying on a single physical spare storage device. This has the advantage of mitigating the mismatch that can otherwise result from reading in parallel from multiple devices and then writing to a single device. The invention is advantageous for a RAID array comprising an array of SSD devices, due to the significant difference between fast read and slower write speeds in a SSD RAID array.

The spare storage device to which data is migrated after rebuilding to the vdisk may be a selected spare SSD device or another type of device within the array, such as a lower cost HDD. In one embodiment of the invention, the spare storage device may be a distributed virtual storage device and yet the invention is still advantageous for fast recovery because the pre-migration rebuild step is performed using an optimal virtual storage area that has been determined to have a desired write capacity to mitigate write bottlenecks. For example, the rebuild may be performed using allocated virtual storage on a plurality of high performance drives such as SSDs, to minimize the period of vulnerability, and then the rebuilt data can be migrated to HDD storage.

In one embodiment, the migrating step comprises a bulk copy operation to a dedicated spare device, without the need for striping of blocks across multiple devices.

In one embodiment, the migrating step is carried out on completion of the rebuild to the provisioned virtual storage area, but in an alternative embodiment the migrating step can be started before completion of rebuild if this will speed completion of the data recovery process.

BRIEF DESCRIPTION OF THE DRAWINGS

Embodiments of the present invention are described below in more detail, by way of example only, with reference to the following drawings in which.

DETAILED DESCRIPTION OF THE EMBODIMENTS

Figure 1:
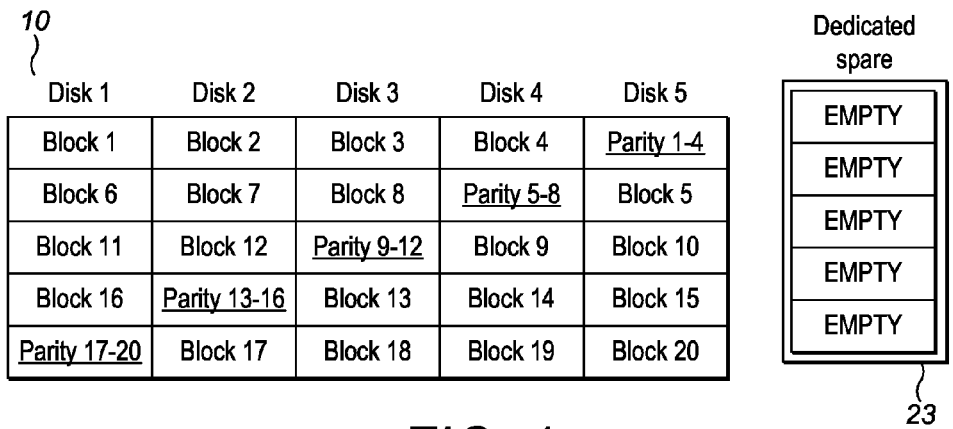
FIG. 1 illustrates a RAID 5 array with rotated block interleaved Parity (Left symmetric).
Figure 2:
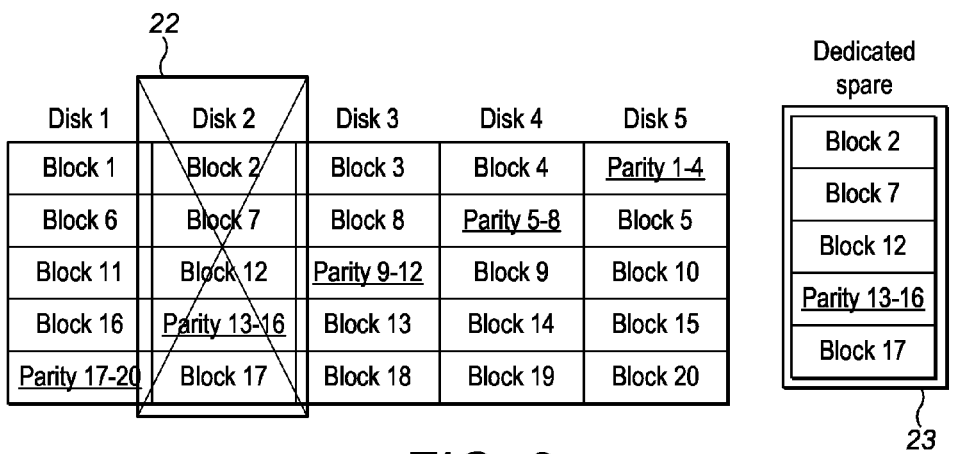
FIG. 2 illustrates a reconstructed RAID 5 following a disk failure.
Figures 3, 4:
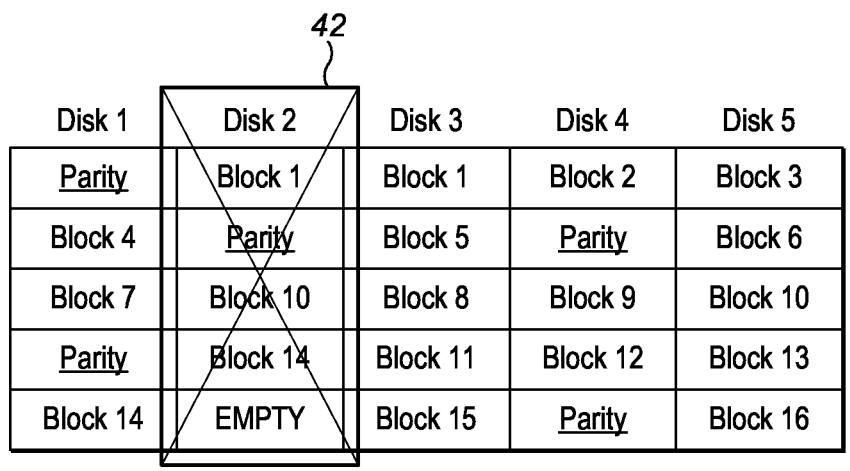
FIG. 3 illustrates a RAID 5E array.
FIG. 4 illustrates a reconstructed RAID 5E array following a disk failure.

As will be appreciated by one skilled in the art, aspects of the present invention may be embodied as a system, method, computer program product or computer program. Accordingly, the present invention may be implemented entirely in hardware, a storage controller according to the invention may be implemented entirely in software (including firmware, resident software, micro-code, etc.) or an embodiment may combine software and hardware aspects that may all generally be referred to herein as a "system" or a component part of a system. Furthermore, aspects of the present invention may take the form of a computer program product comprising one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed narrowly as meaning "consisting only of".

References in this specification to "an embodiment" or "this embodiment", or the like, mean that the particular feature, structure or characteristic being described is included in at least one embodiment of the present invention. Occurrences to such phrases in this specification do not necessarily refer to the same embodiment, nor are they necessarily mutually exclusive.

Embodiments of the invention provide rebuilding lost data onto a virtual disk ("vdisk") that is provisioned to be fast enough not to be a bottleneck. In embodiments, the vdisk is a temporary reconstruction target space that has sufficient write capacity and speed to enable Input/Output operations to meet the demanding speed requirements of SSD RAID array reconstruction. When reconstruction is completed on the temporary vdisk, said vdisk can be migrated to image mode onto a selected physical spare disk (i.e. written in a non-striped format).

A SSD RAID array may be controlled by a software-implemented controller, such as an IBM® SAN Volume Controller (SVC) product or an IBM Storwize V7000 system or by other types of controllers. Certain storage systems such as the IBM® Storwize V7000 system can be configured as an array consisting of at least one SSD and/or at least one HDD and/or at least one drive of a different type. Amongst those drives, at least one drive may be configured to be a spare drive. In a configuration wherein drives used to store user data are SSDs, the or each spare drive of the array may be a SSD or a HDD or a drive of a different type. Certain storage controllers provide virtual storage whose Input/Output operations per second (IOPS) capabilities are better than individual physical disk capabilities.

Storage controllers such as IBM Storwize V7000 Easy Tier® controllers introduce features of allocating data to different 'tiers' of storage devices. The controller provides a mechanism to migrate or move data to the most appropriate tier within the IBM Storwize V7000 solution, based on levels of read/write activity. For example, the IBM Storwize V7000 Easy Tier® controller enables data migration of "hot data" with high I/O density and low response time requirements on a high performance tier (e.g SSDs), while migrating "cooler data" accessed at lower rates to a lower performance tier (e.g HDDs).

Figure 5:
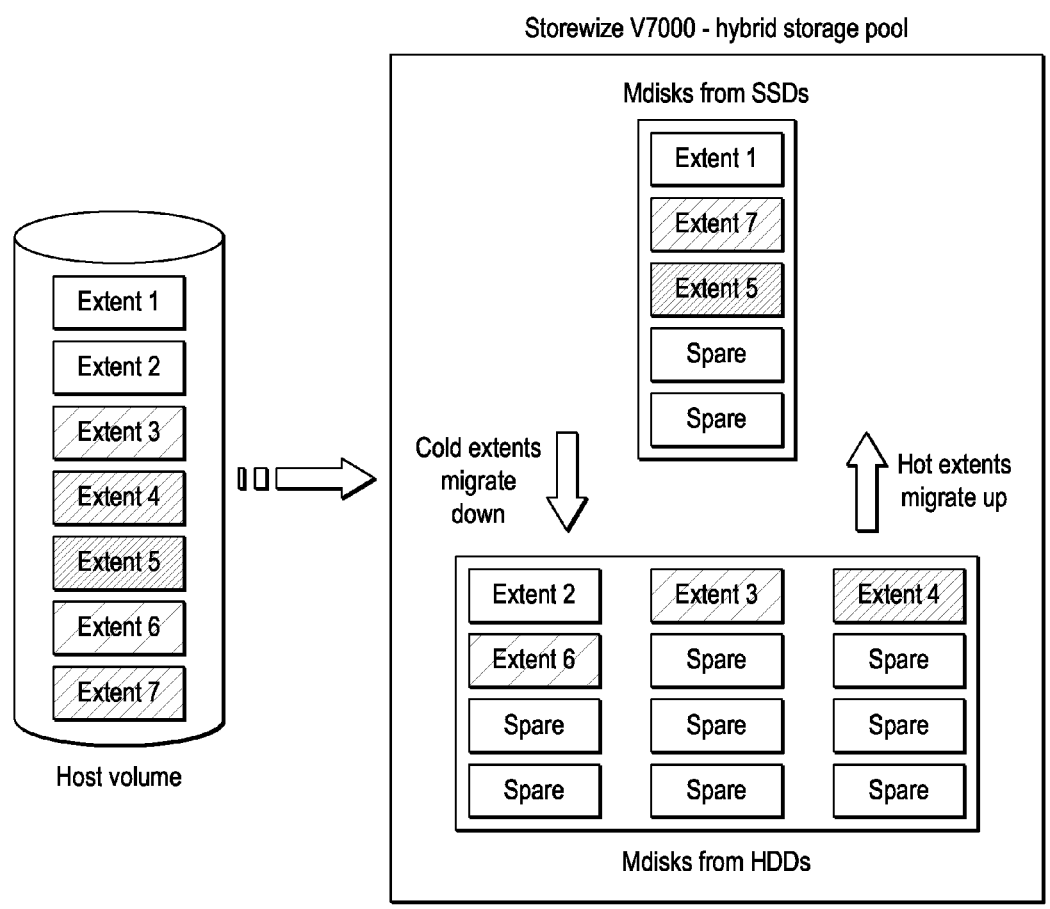
FIG. 5 illustrates the concept of allocation tiered storage allocation.

FIG. 5 illustrates the concept of tiered storage allocation, such as is used in an IBM Storwize V7000 Easy Tier® controller. The IBM Storwize V7000 allocates several managed disks (MDisks) into various storage pools. A Managed disk (MDisk) refers to a unit of storage that IBM Storwize V7000 controller virtualizes. The Easy Tier® performance function monitors the host I/O activity and latency on all volumes and migrates or moves high activity data (or "hot" data) to a higher tier device (e.g. a SSD) within the storage pool. It also moves data for which activity has dropped off (or "cooled") from a high tiered MDisk back to a lower tiered MDisk (e.g. a HDD). Hence Easy Tier® features make it possible to make good use of the Input/Output performances of SSDs during normal use, and the drives (e.g. SSDs) of the IBM Storwize V7000 system can be configured into RAID arrays for a high performance redundant storage solution. The IBM Storwize V7000 system uses IBM Storage System Easy Tier features to automatically place a volume of "hot" data on better-performing storage.

However, current solutions do not optimize rebuild performance. The present invention adds additional flexibility and control during recovery, to enable a fast rebuild with a reduced vulnerability period during which the array is at risk from a second failure. This increases the reliability of the overall storage system.

An embodiment of the present invention uses RAID arrays that include high performance SSD storage devices, and enables rebuilding to temporary virtual storage within the array, which virtual storage is allocated to enable a fast rebuild in response to failure of a storage device within the array. The allocation and use of a suitable distributed virtual storage area and subsequent migration to a spare storage device achieves a reduction of the time taken to rebuild data within the RAID array, as compared with systems that rely on rebuilding data directly to a single dedicated spare storage device.

Embodiments of the invention are described in the context of an SSD RAID array having a single physical spare drive, and the invention is highly advantageous in this context. However, it will be appreciated by one skilled in the art that the scope of the present invention is not limited to SSD storage and is not limited to a RAID array comprising only one physical spare device, as there may be multiple spares or a distributed spare.

In embodiments of the invention, a fast write performance virtual disk with appropriate Input/Output capability is provided to reduce the time of data reconstruction when a storage device of the RAID array fails.

In a first embodiment, a virtual storage area is allocated for rebuilding data lost from a failed device of an array of SSD devices. Allocating the virtual space entails evaluating or calculating the required storage capacity and write IOPS and the data size per operation so that the write operations do not constitute a bottleneck, and then allocating virtual storage that achieves or approximates the requirements.

Figure 6:
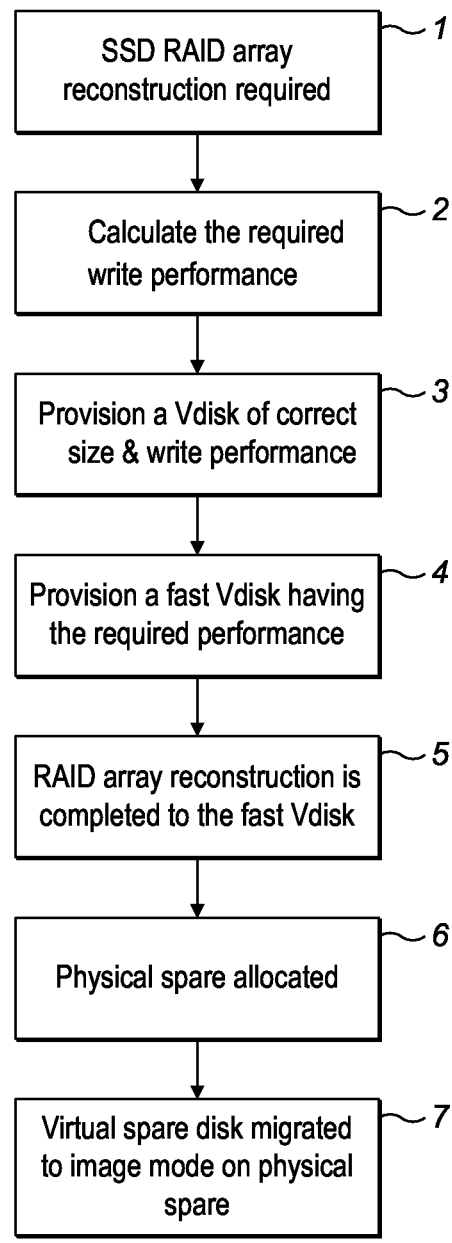
FIG. 6 is a flow diagram illustrating different steps describing a method according to a first embodiment of the invention.

A first embodiment is now described with reference to FIG. 6. In step 1, it is identified that a SSD RAID array reconstruction is required. Such identification may be a result of an indication that one device of the array is expected to fail or is failing. Alternatively, an indication that the SSD RAID array reconstruction is required may be obtained after one of the devices has already failed.

In step 2, a likely required number of write Input/Output operations per second (IOPS) of a target virtual storage area is calculated, such that the write operations do not create a bandwidth bottleneck. This takes account of the number of devices remaining in the array and the speed of these underlying physical devices, since these parameters determine the potential number of read operations per second that can be expected and which need to be matched by write operations if a bottleneck is to be avoided. An example implementation is described in more detail below.

In step 3, a virtual disk (vdisk) of a suitable size and write Input/Output operations capability is requested to be allocated for the purpose of rebuilding the array. A virtual disk provisioning system such as that of the SAN Volume Controller (SVC) can be requested to allocate and configure the virtual disk of the correct size and write Input/Output operations capability. This is described in more detail below. In one embodiment, a virtual storage area is allocated that corresponds to the total storage capacity of the failed device, to ensure that there is sufficient allocated storage for all data lost by the failure.

Thereafter in step 4, the virtual disk provisioning system allocates a vdisk with the required storage performance, mainly size and Input/Output operations capability. The required vdisk storage performance will depend on the physical characteristics of the underlying physical devices such as speed of the remaining physical devices, the storage capacity of the failed device, the RAID array size and especially the number of devices in the array, and possibly other parameters. The vdisk allocated can preferably be distributed across a number of devices amongst the remaining working physical SSD devices, to enable a number of writes to be performed in parallel (following parallel reads from a number of devices). The vdisk can also be allocated from physical devices which are outside of the RAID array storage system. It should be noted that if several arrays are used, the number of arrays will impact the storage performance. The vdisk allocated is optimum when the vdisk storage performance is equal or close to the required performance calculated in step 2. It should be noted that optimum allocation of a virtual spare space avoids over-allocating virtual spare space.

In step 5, the RAID array reconstruction is started such that data that is lost is recovered onto the fast vdisk thereby allocated. The data lost in the failure of one device of the RAID array is typically rebuilt from data striped across the remaining devices, and from the parity information.

In one embodiment of the invention, the allocated vdisk which is required for a relatively short time and to avoid write bottlenecks includes storage space on the selected final target physical device as well as some storage space on other devices. This avoids having to allocate more storage space than necessary on other devices, which still achieving the objective of mitigation of delays during the rebuild step.

The execution of instructions for recovering data can be done by means of a computer program running in a memory. According to embodiments of this invention, the data recovered as a result of the execution of these instructions is written to the allocated vdisk. The characteristics of the vdisk allocated dynamically when required, mainly the size of the vdisk and its IOPS/bandwidth capability, are such that the time spent in writing the rebuilt data onto the vdisk is minimized. Hence the performance of RAID array reconstruction is improved. Such improvement can be made possible by use of tiered storage allocation that takes account of the required write IOPS performance and required storage area size. In one embodiment of the invention, a physical storage device from a relatively slow tier of the tiered storage system may be recovered to a virtual disk within a faster tier to achieve fast recovery. This difference of speed can be because the underlying storage devices have different speeds, such as in the case of failure of a slower speed device, which is recovered from by initially rebuilding data on devices such as SSDs in a high performance tier of the available storage devices, followed by migrating the data to another device. Speed difference can also arise if the network links that attach the devices of the different tiers to the controller have different bandwidths. The invention can be highly advantageous in this context, if the final replacement for the failed unit of storage would fail to achieve a fast data rebuild, such as for example if provided remotely by a cloud storage provider.

In one embodiment of the invention, the vdisk is allocated on devices (e.g. on a storage tier) that differ from the devices that need to be read. This has the advantage of removing any writing workload from the devices that need to be read during the rebuild step, mitigating potential delays due to bandwidth constraints.

In step 6, a physical spare storage device is allocated. The physical spare could be a disk or other device which is physically part of the storage system containing the RAID array, or it could be a device which is outside of the RAID array.

Finally, in step 7, the data written to the allocated virtual storage area (vdisk) is migrated to image mode (i.e. stored without striping across multiple devices) on the allocated physical spare device.

Completing the RAID array reconstruction on the vdisk before starting migrating to image mode onto the physical spare advantageously reduces the risk of thrashing that may occur when rebuilding onto the vdisk is done simultaneously with migrating to the physical spare device. Migrating the vdisk to image mode on the physical spare device results in obtaining a copy of the contents of the vdisk on the physical spare.

In this first embodiment, a minimum time interval can be set between the RAID array reconstruction on the vdisk and the time at which the migration from the vdisk to the physical spare device is commenced. This time interval may be configured to be large enough to prevent starting the physical spare device migration while within a period of vulnerability, so that the initial focus is on completing the rebuild to the vdisk and not on migration. The "vulnerability period" corresponds to a period between the initial need for a reconstruction and completion of this reconstruction. During this period, there is a risk of a double failure, especially if processing activity is high; so it is desirable to minimize the vulnerability period.

In one embodiment, the minimum time interval before migrating to the physical spare is configured so that allocation of the spare disk and storage of the vdisk content onto said physical spare is only started once the "vulnerability period" is over. This time interval could be configured for example to be any suitable interval such as a fraction of a second or several minutes. The time interval may correspond to the period of time that elapses after reconstruction of the RAID array on the vdisk and the availability of a spare device.

If, upon completion of the reconstruction onto the vdisk, there is no dedicated physical spare device available or the dedicated physical spare device space is insufficient; copying the vdisk will wait for the availability of the physical spare. In that case, migrating the vdisk to image mode onto the physical spare may start only when physical space has been freed and allocated on one or more devices or upon an indication that a physical spare has become available. Freeing some available space on a device may be initiated when it is detected that the available space on the disk is insufficient for storing the reconstructed data. The availability of a dedicated physical spare device may be indicated, for example, by an interrupt from one of the lower layers (e.g, physical or link) when a physical disk is newly associated or is installed in connection with the RAID array. This requires an intercommunication mechanism between the lower layers and the higher layers, such as is known in the art, onto which is implemented the method of rebuilding the raid array according to the invention. When a physical spare is not yet available when a failure occurs, rebuilding to a fast vdisk and subsequently migrating the data to a physical spare can be highly advantageous in reducing the period of vulnerability to other failures.

In one embodiment of the invention, data segments are migrated to a spare physical disk as soon as the segments are available for migration from the vdisk. The vdisk can be chosen so as to capable of supporting this activity without degrading the performance of the vdisk, to ensure that the vdisk does not become a bottleneck in the reconstruction process.

Maintaining the vdisk until a spare physical disk is available advantageously permits a system administrator to choose an effective replacement solution. For example, it can be decided to select a spare disk for its size and/or its price. The system administrator or controller may for example decide to select a HDD, or another relatively inexpensive drive that matches the size requirement, as the spare drive instead of using a more expensive SSD as the spare drive. Such features as described above are implementable within a storage controller such as the IBM® V7000 system controller.

In another embodiment, the spare disk space is distributed across the remaining working disks rather than being a dedicated physical disk. In this embodiment, the physical disk space is allocated after completion of the data recovery on the vdisk and it may not be possible to immediately allocate the necessary physical space on the remaining disks. Imaging the vdisk onto the physical disks will start when the required physical space is available. Availability of the necessary physical space may, for example, be subject to freeing some space on the remaining disks.

Figure 7:
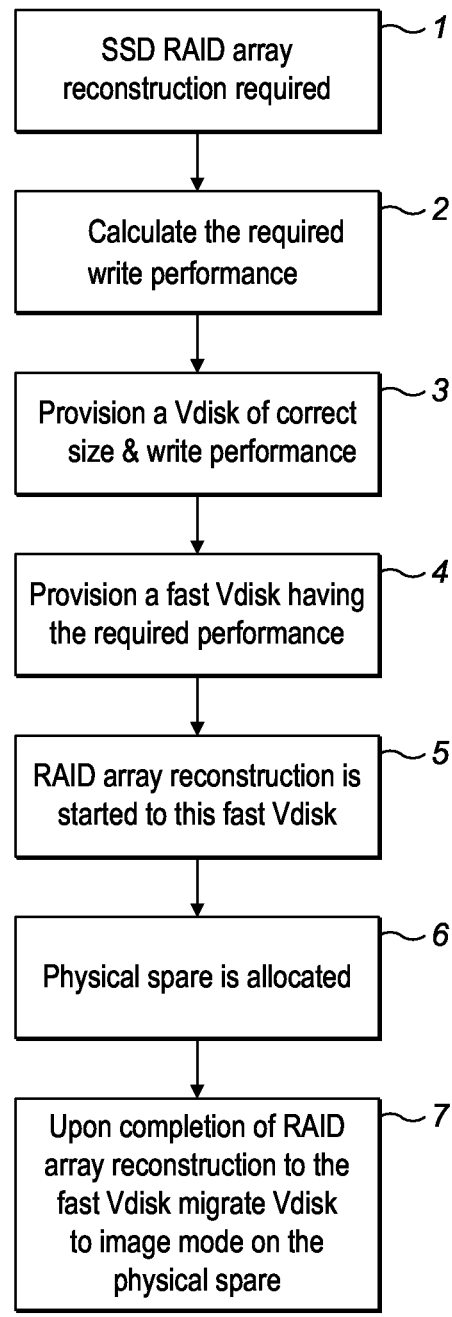
FIG. 7 is a flow diagram illustrating different steps describing a method according to a second embodiment of the invention.

In a different embodiment, illustrated in FIG. 7, steps 1 to 4 are identical to steps 1 to 4 of the first embodiment. In step 5, the recovery of the failed drive is started onto the allocated fast vdisk. In step 6, a physical spare is allocated during the rebuilding operations. In this embodiment, allocation of the physical spare might have been completed before completion of data recovery on the vdisk. Recovering data according to this embodiment may require more processing power and especially bandwidth, because of the additional tasks required for allocating the physical spare. As a result, rebuilding the RAID array according to this embodiment may take longer than the method according to the first embodiment. According to step 7, once allocation of the physical spare is completed, migration take place of the data on the allocated virtual storage area to image mode on the physical spare.

Figure 8:
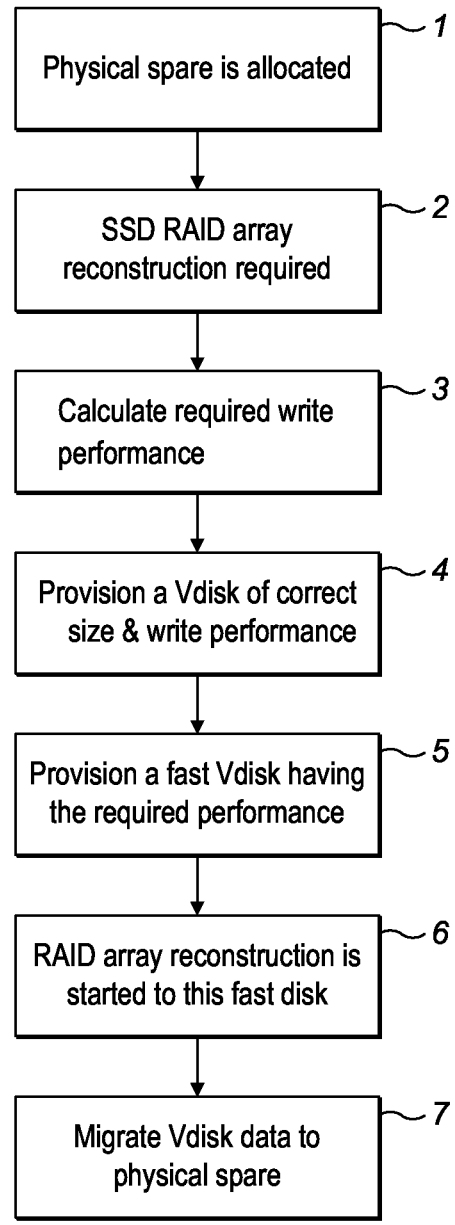
FIG. 8 is a flow diagram illustrating different steps describing a method according to a third embodiment of the invention.

In a further embodiment illustrated by FIG. 8, a physical spare has already been allocated before the data recovery starts to the vdisk (step 1). The other steps are performed as in the previous embodiments. This embodiment may correspond to a scenario of static configuration of a physical spare disk on a storage system. This physical spare can be a physical drive of the RAID array dedicated to restoring lost data from a failed disk. It can also be a physical drive which is outside of the RAID array. Alternatively, it can be a distributed spare allocated across the disks of the array before a disk failure. The physical spare should have a storage space large enough to be able to store the rebuilt data. In this embodiment, the data being rebuilt on the vdisk may be copied onto the spare physical disk before the reconstruction is actually completed onto the vdisk. It is noted that imaging onto the physical spare before rebuilding is completed may increase the risk of thrashing due to contention for the datapaths to the source device, which is now being read from as well as written to. There can also be disturbances to a smooth sequence of sequential reads which are optimal for making use of on-disk cache and disk head movement of spinning disks. This risk is significantly reduced when rebuilding lost data onto the vdisk is completed before the start of the operations for imaging the vdisk onto the physical spare space.

In any of the above embodiments, it is noted that until the array of disks has been recovered to either the virtual storage area or spare physical disk, the system is still vulnerable to a second disk failure. Embodiments of the invention seek to reduce the period of vulnerability that lasts until the recovered data is safely stored.

In any of the above embodiments, data copied from the vdisk to the spare physical disk can be removed from the vdisk for freeing additional virtual space after data is migrated onto the physical spare.

It is noted that, in any of the above embodiments, the physical disk onto which the reconstructed data is finally stored can be a SSD or a HDD or any kind of physical drive or memory capable of retaining data permanently. It will be apparent to a person skilled in the art that it is possible to image a vdisk which uses an underlying SSD technology to an HDD or to an even slower device. Choosing a HDD or a slower drive as the physical spare disk rather than a more expensive SSD can result in significant cost saving. The spare disk could be an allocated one of several physical disks dedicated as spare disks. These physical disks can also be allocated from empty disks which were not dedicated as spare disks, or can be allocated from a collection of dedicated spare disks and an empty portion of another physical disk. For example the spare could consist in two SSDs, one HDD and a portion of another used HDD, instead of a single physical spare. Other combinations that would be apparent to a person skilled in the art are within the scope of this invention. Such allocation can be static or dynamic. Upon reconstruction of a SSD RAID array onto a vdisk according to any of the preceding embodiments, imaging the vdisk could be done on a spare physical disk which is part of the RAID array. When the physical spare disk is allocated after the reconstruction is completed or before the reconstruction is started on the vdisk, it is understood that any physical disk capable of permanently storing the data can be used as a physical spare disk. This is because when the RAID array has been rebuilt onto the vdisk, the speed of storage on a physical spare is not as critical.

The following indicates an example method for calculating the performance and capacity requirement for the allocation of the virtual spare disk. As already indicated, the virtual spare space can be distributed on a number of physical drives amongst the remaining working drives of the RAID array. As will be appreciated, for a RAID array comprising N drives, when one drive fails, the virtual spare space may be allocated across all or a subset of the N−1 remaining physical drives. This distributed virtual storage helps to avoid the write bottleneck that could otherwise arise if writing to a single dedicated disk, because the redundant data required to be read for recovery may be striped across the remaining N−1 physical drives (i.e. reading from N−1 devices in parallel and sequentially writing to a single device could cause a bottleneck).

Hence, an estimated requirement for allocating storage space for the virtual spare disk according to embodiments of the invention is given by considering the number of drives from which data may need to be read (N−1), and the read IOPS performance of those drives as well as the ratio of read speed to write speed for the disk technology type. As well as this write speed requirement, it is desirable to allocate sufficient storage for all lost data, but without over-allocation of storage.

In order to allocate the vdisk of the correct size and Input/Output capability, functionality can be added to a controller of a storage system such as the SAN Volume Controller and Storwize V7000 system of IBM® Corporation. Such systems typically can make use of command lines such as:

mkvdisk–size $X$–write_iops_qos $Z$.

where the command 'mkvdisk' creates a virtual disk (vdisk) and '−size X' specifies the capacity or the size of the allocated vdisk, 'write_iops_qos Z" means the quality of service in terms of the bandwidth (i.e. the amount of data that can be handled per unit of time) and in terms of the number of individual requests per unit of time (the iops) to avoid a bottleneck during recovery; and wherein Z=(N−1)*read IOPS on drives. Specifically, we wish to achieve an improved number of write operations per second, with a rebuild bandwidth which is a multiple of the IOPS and the size of the writes. The data may be rebuilt in 128 kbit strips (where a strip is one of the chunks of data that contributes towards a parity block).

To take account of other bottlenecks, including computation speed and bandwith limitations of the drives of the array, an adapted value for Z could be:

Z=min(
min(sequential_read_speed_of_arraydrives,
single_drive_read_bandwidth_ceiling)*
number_of_remaining_drives_in_array),
whole_array_read_bandwidth_ceiling,
CPU_XOR_bandwidth_ceiling)
)

where 'min' is a function that returns a value which is less than or equal to all other values specified in the parameters of the function; 'sequential_read_speed_of arraydrives' is how many IOPS (requests) an array drive can respond to per second; 'single_drive_read_bandwidth_ceiling' is the maximum amount of data per second that can be read from a single drive running at full speed; and generally 'bandwidth= (IOPS*size of each request)'. In rebuild the IOPS are all the same size (one strip—say 128K for example) so we can consider which will become the bottleneck by taking the IOPS and multiplying by 128K and seeing if it is bigger than the maximun bandwidth—if it is, we just use the bandwidth ceiling and vica versa. 'Number_of_remaining_drives_in_array' defines how many drives we are reading from; 'whole_array_read_bandwidth_ceiling' is the bottleneck between all the array drives and the storage controller. For example, in a system which the drives in a drive enclosure, this could be the bandwidth of the cable to that enclosure. For a set of drives in a cloud storage area, this may be the data rate that can be read across the ethernet cable. 'CPU_XOR_bandwidth_ceiling' indicates how much of the processing can be done using the CPU, using the parity and the remaining data in an XOR formula, to reconstruct the missing data. In a single drive rebuild, the CPU is only being used about 5% so this is rarely a factor in modern systems.

This formula is derived to determine the minimum performance of the vdisk that is needed so that the vdisk has adequate read and write performance for the rebuild operation to not be slowed by writing the reconstructed data to the storage medium. Thus, a data storage system according to an embodiment of the invention can make full use of the available read performance of the remaining storage devices of the array that are being read from during a data rebuild.

In another embodiment of the invention, a storage controller can be configured to implement a storage policy such that either (1) user-initiated reads take priority, such that they are not heavily impacted by the recovery processing, or (2) data rebuild operations take priority to mimimize the period of vulnerability.

Although the above embodiments have been described mainly for RAID arrays consisting of SSDs, it should be understood that the invention is not limited to a specific type of storage device. It will be apparent to a person skilled in the art that the invention is applicable to RAID arrays consisting of HDDs or other disks. It is equally applicable to RAID arrays consisting of a combination of devices of different types and combinations of storage capacity provided across a network such as in internet cloud storage based systems.

For example, the RAID array whose reconstruction is needed may consist of HDD drives. In this case, when the array reconstruction is needed following a disk failure, a virtual spare disk (vdisk) is allocated on the remaining HDD drives. The RAID array is rebuilt on the vdisk allocated from the underlying HDDs. Finally the vdisk is migrated to image mode on a physical spare according to any previous embodiment. The physical spare could be a HDD drive or a SDD drive or any other type of drive as already mentioned above.

In another example, the RAID array consists of HDD drives and SDD drives. In this example, a HDD drive fails and a virtual spare disk (vdisk) is allocated on available physical SSD drives. Allocating a vdisk on distributed SSD drives advantageously provides a virtual disk benefiting from high performances of the underlying SSDs. Finally the vdisk is migrated to image mode on a physical spare according to any previous embodiment.

What is claimed is:

1. A method of data recovery, for responding to failure of a storage device in an array of storage devices, the method comprising:
   determining a required write performance for rebuilding data of a failed device, based at least partly on the potential read performance of storage devices in a data rebuild;
   allocating a virtual storage area within available storage, which allocation of virtual storage is based at least partly on the required write performance;
   rebuilding data of a failed device by writing to the allocated virtual storage area; and
   migrating the rebuilt data to at least one data storage device to complete the data recovery.

2. The method of claim 1, wherein the potential read performance is determined by reference to a potential number of read input/output operations per second (IOPS) of data storage devices to be read during a data rebuild and/or the potential amount of data read in each read operation.

3. The method of claim 1, wherein determining a required write performance comprises calculating the required size of virtual storage area and/or a required write speed for rebuilding data of a failed device.

4. The method of claim 1, wherein the allocating comprises one or more of:
   selecting an optimal number of devices from the available data storage devices within the array;
   selecting an optimal type of device from the available types of data storage device within the array.

5. The method of claim 1, for use in a data storage array that has respective high performance and low performance tiers of data storage devices in the data storage array, wherein the allocating comprises selecting at least one device from a high performance tier of the array.

6. The method of claim 1, wherein the migration is started on one of: expiry of a predetermined period of time following the start of the rebuilding of lost data onto the virtual storage area; detection of availability of the at least one storage device following the start of rebuilding of lost data onto the virtual storage area; completion of the rebuild of data onto the virtual storage area; completion of a predefined portion of the rebuild of data onto the virtual storage area.

7. The method of claim 1, wherein the determining the required write performance prevents a bottleneck when writing to the allocated virtual storage area.

8. The method of claim 7, wherein the allocating is based on physical characteristics of underlying physical devices including at least one of: speed, storage capacity of a failed device; RAID array size; and a number of devices in an array.

9. The method of claim 8, further comprising allocating the at least one data storage device, wherein the migrating the rebuilt data is based on allocating the at least one data storage device.

10. A data storage controller for data recovery in response to failure of a storage device of a storage array, the controller being operable to:
    determine a required write performance for rebuilding data of a failed device, based at least partly on the potential read performance of storage devices in a data rebuild;
    allocate a virtual storage area within available storage, which allocation of virtual storage is based at least partly on the required write performance;
    rebuild data of a failed device by writing to the allocated virtual storage area; and
    migrate the rebuilt data to at least one data storage device to complete the data recovery.

11. A data storage controller according to claim 10, wherein the potential read performance is determined by reference to a potential number of bytes per second read from available storage devices of the array.

12. A data storage controller according to claim 10, wherein the potential read performance is determined by reference to a potential number of read input/output operations per second of storage devices to be read during a data rebuild and/or the potential amount of data read in each read operation.

13. A data storage controller according to claim 10, wherein the determination of a required write performance includes determining a required data capacity and write speed.

14. A data storage controller according to claim 10, wherein the allocating comprises at least one of: selecting an optimal number of devices from the available data storage devices within the array; selecting an optimal type of device from the available types of data storage device within the array.

15. A data storage controller according to claim 10, wherein the data rebuilt onto the allocated virtual storage area is migrated to a single physical storage device to complete the data recovery.

16. A data storage controller according to claim 10, wherein the at least one storage device to which data is migrated is allocated for use in recovery before starting rebuilding lost data onto the virtual storage area.

17. A data storage controller according to claim 10, wherein the at least one data storage device to which data is migrated is allocated for use in recovery during or after rebuilding lost data onto the virtual storage area, on expiry of a predetermined period of time, on detection of availability of the physical storage means, or on detection of completion of the rebuild.

18. A data storage controller according to claim 10, wherein the migration is started on one of: expiry of a predetermined period of time following the start of the rebuilding of lost data onto the virtual storage area; detection of availability of the at least one storage device following the start of rebuilding of lost data onto the virtual storage area; completion of the rebuild of data onto the virtual storage area; completion of a predefined portion of the rebuild of data onto the virtual storage area.

* * * * *